(12) United States Patent
Wan et al.

(10) Patent No.: US 9,357,554 B2
(45) Date of Patent: May 31, 2016

(54) METHOD AND APPARATUS FOR COEXISTENCE OF MULTIPLE OPERATING ENTITY SYSTEMS

(75) Inventors: Lei Wan, Shenzhen (CN); Yunzhe Hou, Shenzhen (CN); Xiaotao Ren, Beijing (CN); Yongxia Lv, Beijing (CN); Yang Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 921 days.

(21) Appl. No.: 13/255,825

(22) PCT Filed: Mar. 11, 2009

(86) PCT No.: PCT/CN2009/070750
§ 371 (c)(1),
(2), (4) Date: Sep. 9, 2011

(87) PCT Pub. No.: WO2010/102449
PCT Pub. Date: Sep. 16, 2010

(65) Prior Publication Data
US 2012/0002662 A1    Jan. 5, 2012

(51) Int. Cl.
*H04W 72/08* (2009.01)
*H04W 16/10* (2009.01)

(52) U.S. Cl.
CPC ............ *H04W 72/082* (2013.01); *H04W 16/10* (2013.01)

(58) Field of Classification Search
CPC ............................. H04W 72/082; H04W 16/10
USPC ........................................................ 370/345
See application file for complete search history.

(56) References Cited

U.S. PATENT DOCUMENTS

| 2002/0015393 A1* | 2/2002 | Pan ...................... H04B 7/2618 370/335 |
| 2005/0078828 A1 | 4/2005 | Zheng |
| 2005/0180453 A1* | 8/2005 | Gaskill .................. H04B 3/542 370/465 |
| 2007/0081489 A1 | 4/2007 | Anderson et al. |
| 2007/0087690 A1* | 4/2007 | Karabinis .......... H04B 7/18515 455/12.1 |
| 2007/0173271 A1* | 7/2007 | Hulkkonen ........ H04B 1/10027 455/509 |

(Continued)

FOREIGN PATENT DOCUMENTS

| CN | 1427635 A | 7/2003 |
| CN | 1531790 A | 9/2004 |

(Continued)

OTHER PUBLICATIONS

Office Action issued in corresponding Chinese Patent Application No. 200980119211.4, mailed Mar. 4, 2013.

(Continued)

*Primary Examiner* — Asad Nawaz
*Assistant Examiner* — Saad A Waqas
(74) *Attorney, Agent, or Firm* — Brinks Gilson & Lione

(57) ABSTRACT

The present invention discloses a method and an apparatus for coexistence of multiple operating entity systems, where the method includes: setting part or all of bandwidths of an operating entity in uplink timeslots of a downlink carrier frequency interference region to be in an idle state. By using the present invention, the uplink timeslots of the operating entity in the downlink carrier frequency interference region are set to be in an idle state and do not transmit an uplink transmit signal any longer, which prevents a downlink transmit signal of another operating entity from interfering with an uplink transmit signal of the operating entity.

19 Claims, 7 Drawing Sheets

(56) References Cited

U.S. PATENT DOCUMENTS

| | | | | |
|---|---|---|---|---|
| 2008/0107047 A1* | 5/2008 | Olfat | ................. | H04W 16/02 370/280 |
| 2008/0192660 A1* | 8/2008 | Li | ................. | H04W 72/087 370/294 |
| 2010/0020852 A1* | 1/2010 | Erell | ................. | H04L 1/0026 375/141 |
| 2014/0029586 A1* | 1/2014 | Loehr et al. | ................. | 370/336 |
| 2014/0133477 A1* | 5/2014 | Siomina et al. | ................. | 370/350 |

FOREIGN PATENT DOCUMENTS

| | | |
|---|---|---|
| CN | 1627754 A | 6/2005 |
| CN | 1741490 A | 3/2006 |
| CN | 1787451 A | 6/2006 |
| CN | 1835436 A | 9/2006 |
| CN | 1859201 A | 11/2006 |
| CN | 1889392 A | 1/2007 |
| CN | 1976301 A | 6/2007 |
| CN | 1984057 A | 6/2007 |
| CN | 101162981 A | 4/2008 |
| CN | 101175074 A | 5/2008 |
| EP | 1511190 A1 | 3/2005 |
| EP | 1860906 A1 | 11/2007 |
| EP | 1931154 A1 | 6/2008 |
| EP | 2198550 | 6/2010 |
| JP | 2006217415 A | 8/2006 |
| WO | WO 02075963 A2 | 9/2002 |
| WO | WO 02078369 A1 | 10/2002 |
| WO | WO 03017696 A1 | 2/2003 |
| WO | WO 2007/140666 A1 | 12/2007 |
| WO | WO 2009/035399 A1 | 3/2009 |

OTHER PUBLICATIONS

Extended European Search Report issued in corresponding European Patent Application No. 09841318.0, mailed Nov. 4, 2011.

Written Opinion of the International Searching Authority issued in corresponding PCT Patent Application No. PCT/CN2009/070750, mailed Dec. 24, 2009.

International Search Report issued in corresponding PCT Patent Application No. PCT/CN2009/070750, mailed Dec. 24, 2009.

Swedish Patent Application Serial No. 0702066-2, filed Sep. 14, 2007, 20 pgs, unpublished.

3GPP, "$3^{rd}$ Generation Partnership Project; Technical Specification Group Radio Access Network; Evolved Universal Terrestrial Radio Access (E-UTRA); Physical Channels and Modulation" (Release 8) 3GPP TS 36.211, V8.1.0, Nov. 2007, 54 pages.

Astély et al., "A Future Radio-Access Framework" IEEE Journal on Selected Areas in Communications, vol. 24, No. 3, Mar. 2006, 14 pages.

Huawei, "Carrier aggregation in Advanced E-UTRA" Agenda Item 12, 3GPP TSG RAN WG1#53bis, Warsaw, Poland, Jun. 30-Jul. 4, 2008, 4 pages.

Ericsson, "Usage of UpPTS" Agenda Item 6.1.7, TSG-RAN WG1 #51bis, Sevilla, Spain, Jan. 14-18, 2008, 1 page.

CMCC et al., "Way forward on duration and usage of UpPTS" Agenda Item 6.1.7, TSG-RAN WG1 #51bis, Sevilla, Spain, Jan. 14-18, 2008, 1 page.

Nokia Corporation, "Configuration of the length of DwPTS, UpPTS and GP for LTE TDD" Agenda Item 6.1.7, 3GPP TSG RAN WG1 Meeting #51bis, Sevilla, Spain, Jan. 14-18, 2008, 4 pages.

* cited by examiner

S101
Set uplink timeslots of an operating entity in a downlink carrier frequency interference region to be in an idle state

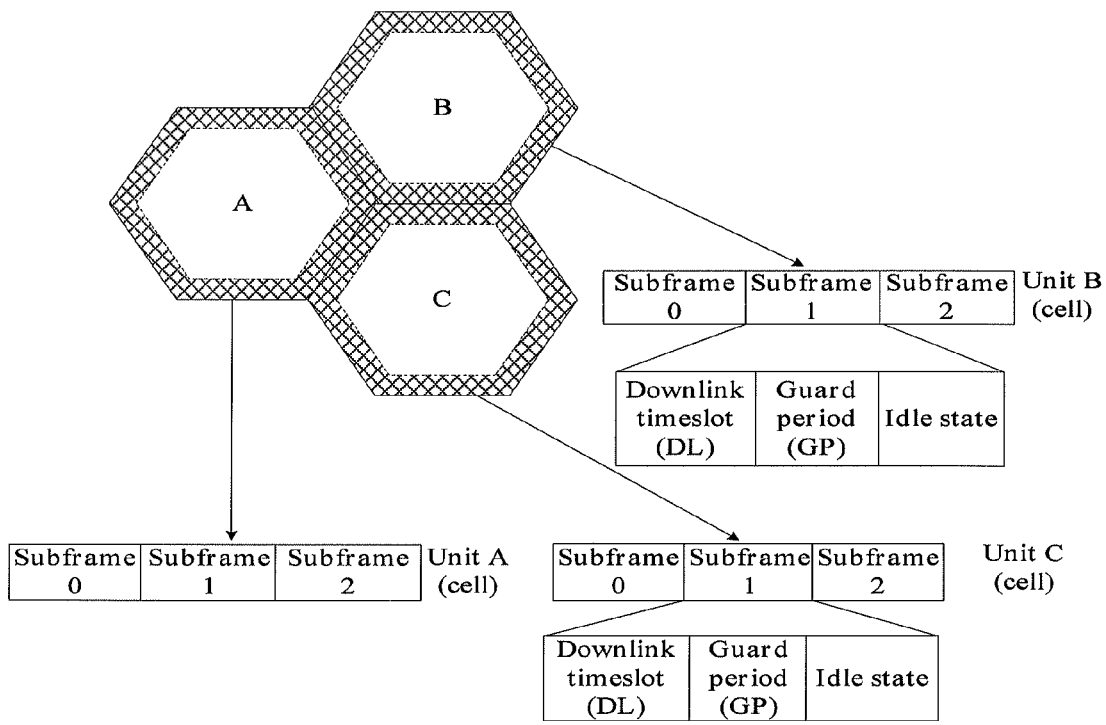

FIG. 7

| A NodeB sends control signaling to a UE, where the control signaling includes an instruction that forbids the UE served by an operating entity to send an signal in an uplink timeslot | S201 |

| After receiving the control signaling, the UE sets uplink timeslots of the downlink carrier frequency interference region to be in an idle state and does not send a signal in the downlink carrier frequency interference region | S202 |

| The UE transmits an uplink transmit signal through an uplink carrier frequency, where the uplink transmit signal originally needs to be sent in an uplink timeslot of the downlink carrier frequency interference region | S203 |

FIG. 8

METHOD AND APPARATUS FOR COEXISTENCE OF MULTIPLE OPERATING ENTITY SYSTEMS

CROSS-REFERENCE TO RELATED APPLICATIONS

This application is a National Stage of International Application No. PCT/CN2009/070750, filed Mar. 11, 2009, which is hereby incorporated by reference in its entirety.

FIELD OF THE INVENTION

The present invention relates to radio communications technologies, and in particular, to a method and an apparatus for coexistence of multiple operating entity systems.

BACKGROUND OF THE INVENTION

In an existing frequency division duplex (FDD) radio communications system, a mechanism is required to support the FDD system in obtaining symmetry of uplink and downlink channels. At present, a unified division duplex (UDD) mode is used to solve the problem. The practice is to use a frame format shown in FIG. 1, where $f_{UL}$ is an uplink carrier frequency of the FDD system and $f_{DL}$ is a downlink carrier frequency of the FDD system. Each subframe represents a transmission time window. In the FDD system, subframes with the same number on different carrier frequencies may be transmitted simultaneously. For example, subframe 0 on the uplink carrier frequency and subframe 0 on the downlink carrier frequency may be transmitted simultaneously. In the frame structure, subframe 2 and subframe 7 on the downlink carrier frequency are special subframes. A special subframe is decomposed into three timeslots: a downlink (DL) timeslot for downlink transmission, a guard period (GP), and an uplink (UL) timeslot for uplink transmission, which are represented by DL, GP, and UL respectively in the accompanying drawings. A sounding reference symbol (SRS) may be transmitted in a DL timeslot, where the SRS is used to reflect a downlink channel state, so that a NodeB can obtain downlink channel state information by using the symmetry of uplink and downlink channels.

SUMMARY OF THE INVENTION

Embodiments of the present invention provide a method and an apparatus for coexistence of multiple operating entity systems, so that interference (that is caused by asynchronization of networks) of a signal in a neighboring cell with an uplink transmit signal can be reduced.

To achieve the objective, embodiments of the present invention adopt the following technical solutions:

A method for coexistence of multiple operating entity systems includes:

setting uplink timeslots of an operating entity in a downlink carrier frequency interference region to be in an idle state.

An apparatus for coexistence of multiple operating entity systems includes:

a setting unit, configured to set uplink timeslots of an operating entity in a downlink carrier frequency interference region to be in an idle state.

The method and apparatus for coexistence of multiple operating entity systems provided in the embodiments of the present invention set the uplink timeslots of an operating entity in a downlink carrier frequency interference region to be in an idle state so that an uplink transmit signal is no longer transmitted, which prevents a downlink transmit signal of another operating entity from interfering with an uplink transmit signal of the operating entity.

BRIEF DESCRIPTION OF THE DRAWINGS

FIG. 7 is a schematic diagram illustrating coexistence of systems of operators in different countries according to a third method embodiment of the present invention;

FIG. 8 is a flowchart of a fourth method embodiment of the present invention;

DETAILED DESCRIPTION OF THE EMBODIMENTS

Figure 2:
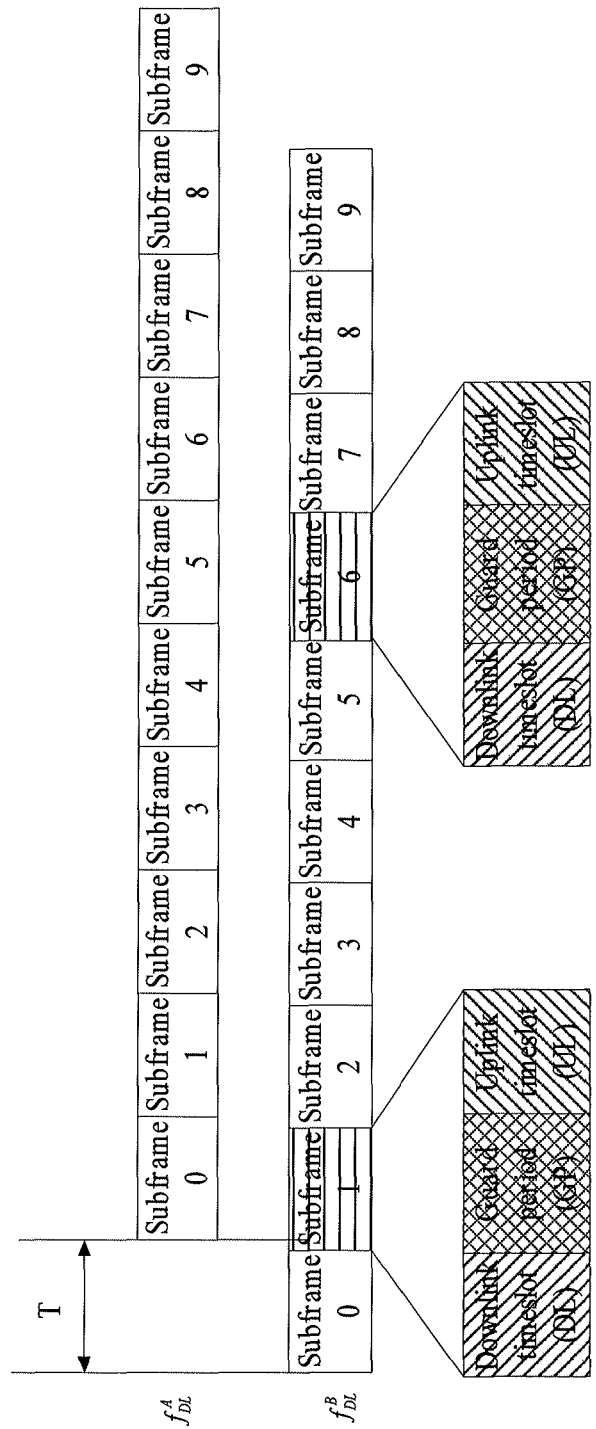
FIG. 2 is a schematic diagram illustrating interference of systems of different operators that is not caused by synchronization of networks in the prior art.

In a process of obtaining symmetry of uplink and downlink channels by an existing FDD system, the inventor finds at least the following problem in the prior art: Operating entities implementing radio communication in neighboring regions are often not the same one. The operating entities are service providers or operators who independently operate a network. Because network systems operated by different operating entities are always asynchronous, a downlink subframe of a system operated by another operating entity interferes with uplink transmission in a subframe of an uplink timeslot corresponding to a special subframe of the system. As shown in FIG. 2, $f_{DL}^{A}$ represents a downlink carrier of operating entity A, and $f_{DL}^{B}$ represents a downlink carrier of operating entity B. Networks operated by operating entities A and B are asynchronous, and a time difference is T. If subframe 1 of operating entity B performs uplink transmission in an uplink (UL) timeslot, due to asynchronization of operating networks, subframe 0 of operating entity A interferes with the uplink timeslot in subframe 1 of operating entity B; because downlink transmit power in the downlink channel is greater than uplink transmit power, an uplink transmit signal in subframe 1 of operating entity B may receive strong interference from a downlink transmit signal in subframe 0 of operating entity A; as a result, an evolved NodeB (eNB) cannot receive the uplink transmit signal in subframe 1 of operator B accurately.

The following describes the method and apparatus for coexistence of multiple operating entity systems in the embodiments of the present invention in detail with reference to the accompanying drawings.

Method Embodiment 1

Figure 1:
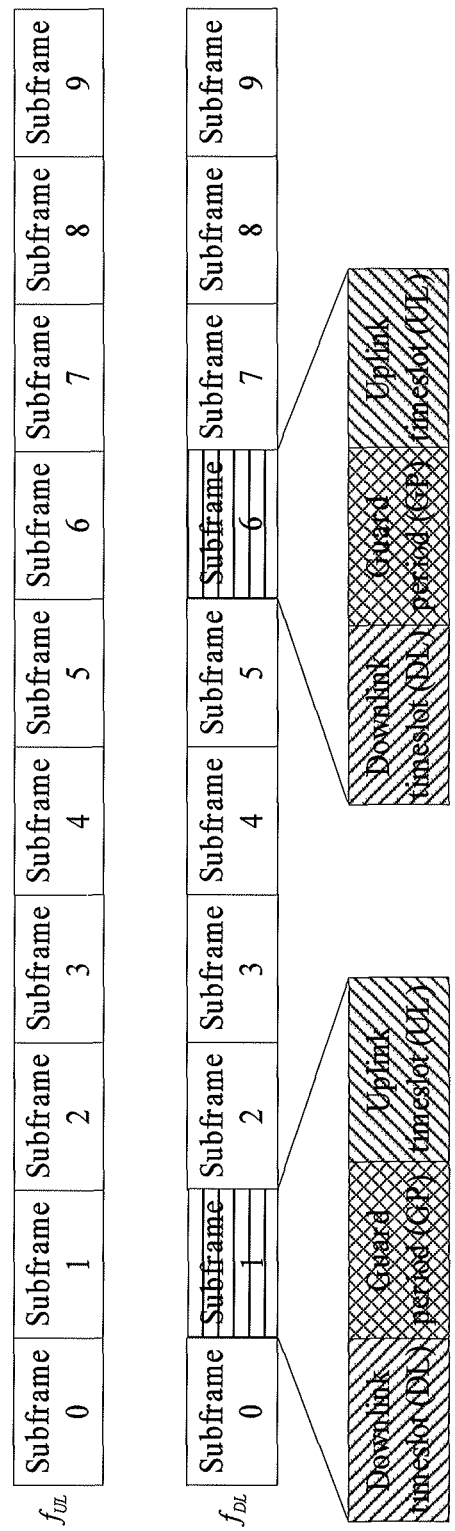
FIG. 1 is a schematic structural diagram of frames in an FDD system in the prior art.
Figures 3, 4:
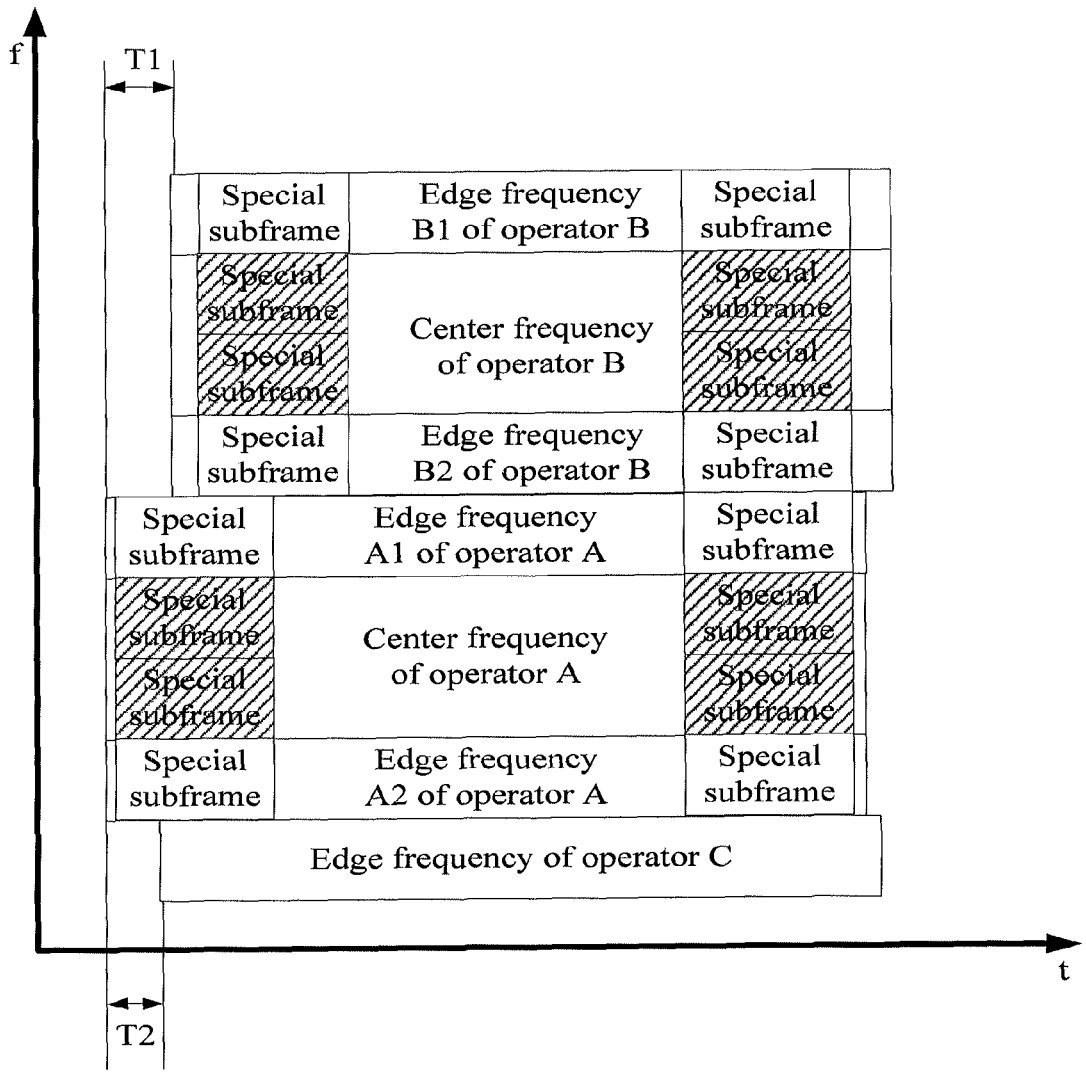
FIG. 3 is a schematic diagram illustrating allocation of bandwidths on downlink carrier frequencies among operators according to a first method embodiment of the present invention.
FIG. 4 is a flowchart of the first method embodiment of the present invention.

This embodiment provides a method for coexistence of multiple operating entity systems which include three operating entities: operator A, operator B, and operator C, where operators A and B use the frame structure shown in FIG. 1, and operator C uses a common frequency division duplex (FDD) system or time division duplex (TDD) system. Allocation of bandwidths on downlink carrier frequencies among operators A, B, and C is shown in FIG. 3. Operators A, B, and C are synchronous in respective internal networks, but networks of operators A, B, and C are asynchronous. A time difference between operator A and operator B is T1, and a time difference between operator A and operator C is T2.

To prevent a downlink transmit signal of another operating entity from interfering with an uplink transmit signal of an operating entity, this embodiment uses the following technical solution as shown in FIG. 4:

S101. Set uplink timeslots of an operating entity in a downlink carrier frequency interference region to be in an idle state.

Figure 5:
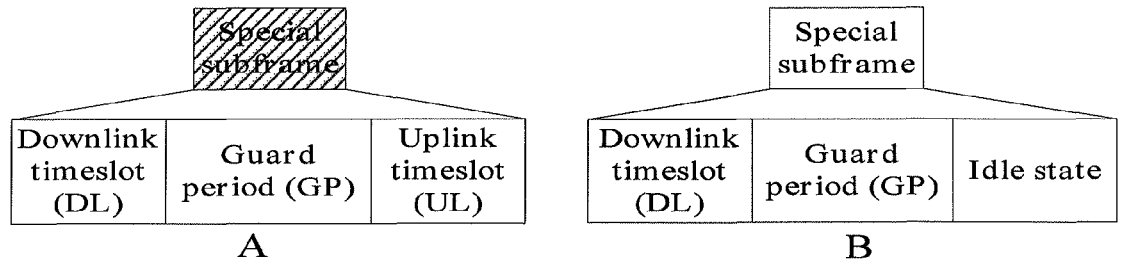
FIG. 5 is a schematic structural diagram of special subframes according to the first method embodiment of the present invention.
Figure 12:
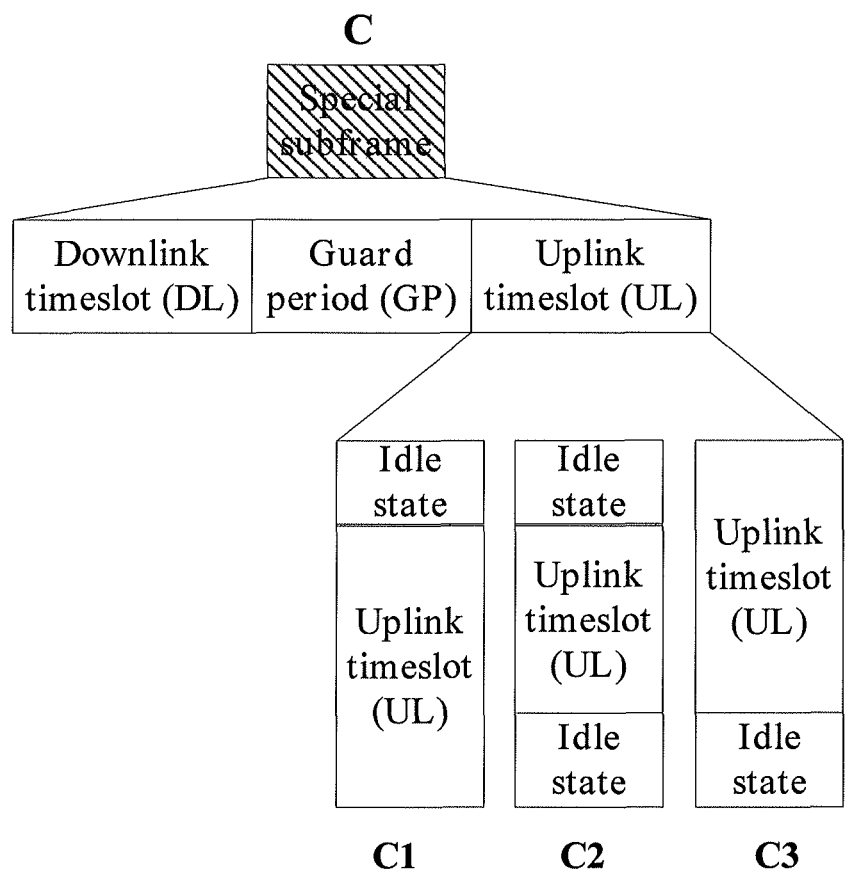
FIG. 12 is a schematic diagram of a downlink carrier frequency band in the case that uplink timeslots of an operator are set to be in an idle state according to the first method embodiment of the present invention.

Specifically, in this embodiment, all uplink (UL) timeslots of special subframes corresponding to adjacent downlink carrier frequencies of operators A and B are regarded as downlink carrier frequency interference regions, and uplink (UL) timeslots in the special subframes on the adjacent downlink carrier frequencies of operators A and B are set to be in an idle state respectively. Structure A in FIG. 5 is a structure of an existing special subframe; structure B in FIG. 5 is a structure of a special subframe in this embodiment, in which an uplink timeslot is set to be in an idle state, that is, no uplink transmit signal is transmitted in the uplink timeslot, which is functionally equivalent to a GP; in this way, a downlink subframe of another operator may be prevented from interfering with an uplink timeslot of an edge frequency of an operator. From the perspective of a whole downlink carrier frequency of an operator, as shown in FIG. 12, a downlink carrier frequency band whose uplink timeslots are set to be in an idle state may be an upper side band or a lower side band, or may include both the upper side band and the lower side band. In addition, compared with an existing anti-interference measure that requires a guard band between adjacent frequencies, this embodiment may use a downlink subframe on a downlink carrier frequency other than an uplink timeslot in a special subframe, and therefore resource utilization is higher.

In this embodiment, edge frequencies A1 and A2 of operator A, edge frequency B2 of operator B, and an edge frequency of operator C are downlink carrier frequencies. An edge frequency is a frequency that may cause interference when carrier frequencies of different operating entities are adjacent, especially when carrier frequencies of neighboring cells are adjacent. On this basis, the downlink carrier frequency interference region of operator A may be further defined as A1 and A2, while the downlink carrier frequency interference region of operator B may be further defined as B2, and the downlink carrier frequency interference region of operator C is the edge frequency. Uplink (UL) timeslots in special subframes on edge frequency A1 of operator A and edge frequency A2 of operator A suffer interference of downlink subframes of the network of operator B and the network of operator C respectively. This case is also applicable to uplink timeslots in special subframes on edge frequency B2 of the network of operator B, where the uplink timeslots suffer interference of the downlink subframes on edge frequency A1 of the network of operator A. To prevent such interference, this embodiment may set uplink (UL) timeslots in the special subframes on edge frequencies A1 and A2 of operator A and edge frequency B2 of operator B to be in an idle state. Only uplink (UL) timeslots of the edge frequencies are set to be in an idle state, which can not only prevent a downlink subframe of another operator from interfering with an uplink timeslot of an edge frequency of an operator, but also further reduce overheads.

Figure 11:
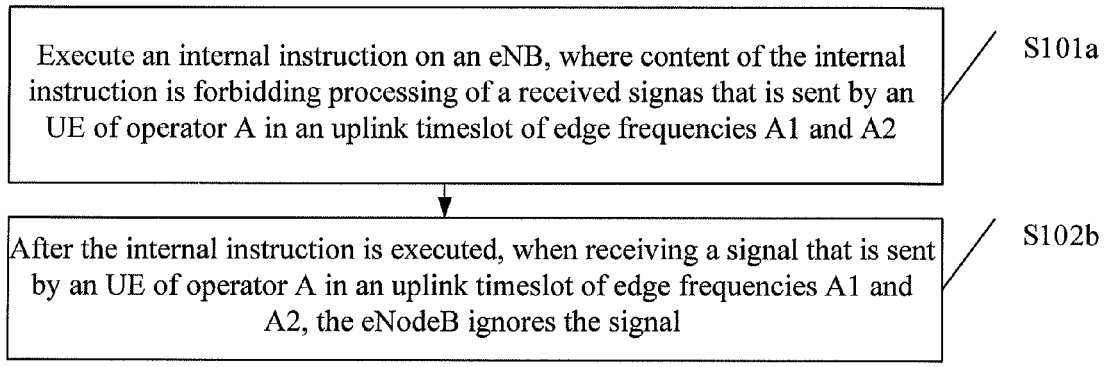
FIG. 11 is a decomposed flowchart for operator A according to the first method embodiment of the present invention.

Taking operator A as an example, a decomposed flowchart of the foregoing process is shown in FIG. 11 and includes:

S101a. Execute an internal instruction on an eNB, where content of the internal instruction is forbidding processing of a received signal that is sent by a user equipment (UE) of operator A in an uplink timeslot of edge frequencies A1 and A2.

S101b. After the internal instruction is executed, when receiving a signal that is sent by a UE of operator A in an uplink timeslot of edge frequencies A1 and A2, the eNB ignores the signal.

Method Embodiment 2

Figure 6:
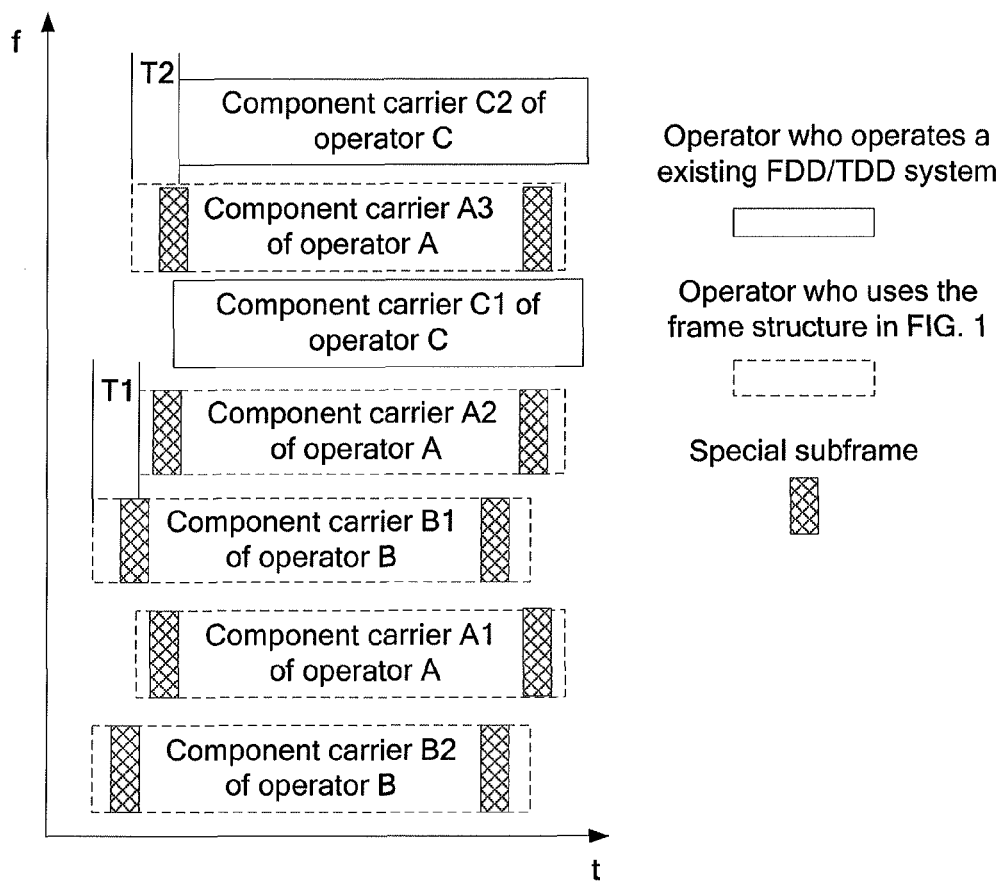
FIG. 6 is a schematic diagram illustrating allocation of bandwidths on downlink carrier frequencies among operators according to a second method embodiment of the present invention.

This embodiment provides a method for coexistence of multiple operating entity systems which include three operating entities: operator A, operator B, and operator C, where operators A and B use the frame structure shown in FIG. 1, and operator C uses a common frequency division duplex (FDD) system or time division duplex (TDD) system. Allocation of bandwidths on downlink carrier frequencies among operators A, B, and C is shown in FIG. 6. Operators A, B, and C are synchronous in respective internal networks, but networks of operators A, B, and C are asynchronous. A time difference between operator A and operator B is T1, and a time difference between operator A and operator C is T2.

This embodiment differs from the first method embodiment in that: A spectrum of each operator is composed of multiple aggregated carriers. Carrier aggregation may be aggregation of multiple carriers of a continuous spectrum or aggregation of carriers of a discrete spectrum. Each carrier may also be called a component carrier. A UE may simultaneously receive or transmit data over one or more component carriers according to a capability of the UE and a service requirement. Bandwidths of the aggregated carriers may be the same or different, for example, a 5 MHz carrier is aggregated with a 10 MHz carrier. In practice, carrier aggregation also depends on the capability of the UE, the service requirement, and network configuration. For example, for N downlink carriers and M uplink carriers configured in a network, depending on a difference in capabilities of UEs, a high-capability UE may use the N downlink carriers and M uplink carriers, and a low-capability UE may use only part of the N downlink carriers, and can transmit data over only part or one of the M uplink carriers.

As shown in FIG. 6, operator A has three aggregated carriers, and operators B and C have two aggregated carriers respectively. Same as the case in the first method embodiment, uplink timeslots of special subframes carried on downlink carriers of operator A suffer interference of downlink subframes carried on adjacent carrier frequencies of operators B and C. For example, component carrier A2 of operator A suffers interference of component carrier C1 of operator C and component carrier B1 of operator B.

To prevent such interference, a method similar to the first method embodiment may be used to cancel interference, that is, a whole downlink carrier frequency band of operator A and operator B is regarded as a downlink carrier frequency interference region, and uplink (UL) timeslots in special subframes of a whole downlink carrier frequency of operator A and operator B are set to be in an idle state. This method effectively solves the problem of the interference between asynchronous networks of different operators in carrier aggregation, and has merits of a good anti-interference effect and low overheads.

Alternatively, uplink (UL) timeslots in special subframes on edge frequencies of operator A and operator B may be set to be in an idle state. Only uplink (UL) timeslots of the edge frequencies are set to be in an idle state, which can prevent a downlink subframe of another operator from interfering with an uplink timeslot of an edge frequency of an operator and further reduce overheads.

Method Embodiment 3

This embodiment provides a method for coexistence of multiple operating entity systems which include operating entities of three different countries: an operator in country A, an operator in country B, and an operator in country C as shown in FIG. 7, where the operator in country B and the operator in country C use the frame structure shown in FIG. 1, and the operator in country A uses a common frequency division duplex (FDD) system or time division duplex (TDD) system. Because of different countries, frequency resources allocated for the operator in country A, the operator in country B, and the operator in country C may overlap (frequency resources are allocated in a unit of countries), and therefore downlink carrier frequencies carrying special subframes for the operator in country A, the operator in country B, and the operator in country C are the same. in country A, the operator in country B, and the operator in country C are synchronous in respective internal networks, but networks of operators A, B, and C are asynchronous. In this case, on condition that the operator in country A, the operator in country B, and the operator in country C use the same downlink carrier frequency, mutual interference certainly exists between uplink timeslots of special subframes of the downlink carrier frequency of operators in countries A, B, and C at edges of geographically adjacent cells of operators in countries A, B, and C.

As shown in FIG. 7, uplink timeslots of the downlink carrier frequency of the operator in country B and the operator in country C are set to be in an idle state and become idle timeslots that are used as GPs. This may prevent the downlink subframes of the operator in country A and the operator in country C from interfering with uplink timeslots carried on the downlink frequency of the operator in country B.

As a variation of this embodiment, if the downlink frequencies of the three operators only partly overlap, only the overlapped part of the uplink timeslots of the downlink carrier frequencies of operators in country B and country C may be set to be in an idle state.

Method Embodiment 4

Any scenario of the first, second, and third method embodiments can be used. As shown in FIG. 8, the method includes the following steps:

S201. A NodeB sends control signaling to a UE, where the control signaling includes an instruction that forbids the UE served by an operating entity to send a signal in an uplink timeslot.

For selection of a frequency of the uplink timeslot, see the description of the first, second, and third embodiments.

S202. After receiving the control signaling, the UE sets uplink timeslots of a downlink carrier frequency interference region to be in an idle state and does not send a signal in the uplink timeslots.

S203. The UE transmits an uplink transmit signal through an uplink carrier frequency, where the uplink transmit signal originally needs to be sent in an uplink timeslot of the downlink carrier frequency interference region.

In this embodiment, a downlink transmit signal of another operating entity is prevented from interfering with the uplink transmit signal of the operating entity, an uplink transmit signal that is not transmitted because the uplink timeslots are set to be in an idle state is transmitted through an uplink carrier frequency, and no adverse impact is imposed on communication of the whole system.

Apparatus Embodiment 1

Figure 9:
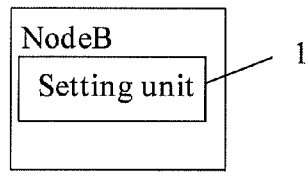
FIG. 9 is a schematic structural diagram of a first apparatus embodiment of the present invention.

As shown in FIG. 9, an apparatus includes:
a setting unit 1, configured to set uplink timeslots of an operating entity in a downlink carrier frequency interference region to be in an idle state.

The setting unit 1 is disposed in a NodeB or an eNB.

Apparatus Embodiment 2

Figure 10:
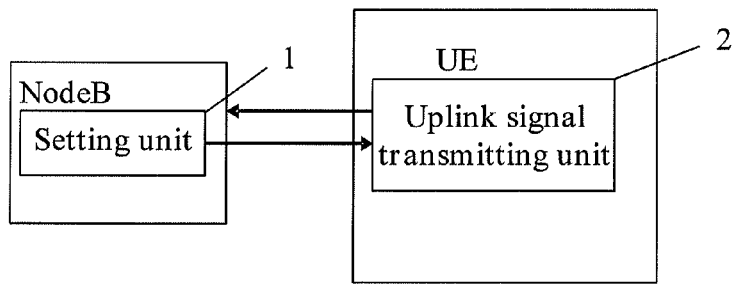
FIG. 10 is a schematic structural diagram of a second apparatus embodiment of the present invention.

As shown in FIG. 10, the apparatus includes:
a setting unit 1, configured to set uplink timeslots of an operating entity in a downlink carrier frequency interference region to be in an idle state; and
an uplink signal transmitting unit 2, configured to transmit an uplink transmit signal through an uplink carrier frequency, where the uplink transmit signal originally needs to be sent in an uplink timeslot of the downlink carrier frequency interference region.

The uplink signal transmitting unit 2 is disposed in a UE.

The downlink carrier frequency interference region is part or all of bandwidths of adjacent carrier frequencies between the operating entity and another operating entity.

Further, the adjacent carrier frequencies are adjacent carrier frequencies in carrier aggregation.

Alternatively, the downlink carrier frequency interference region is part or all of bandwidths at edges of geographically adjacent cells between the operating entity and another operating entity.

The foregoing apparatus embodiments set the uplink timeslots of the operating entity in the downlink carrier frequency interference region to be in an idle state so that an uplink transmit signal is no longer transmitted, which prevents a downlink transmit signal of another operating entity from interfering with the uplink transmit signal of the operating entity.

It is understandable to those skilled in the art that all or part of the processes of the foregoing embodiments may be implemented by hardware instructed by a computer program. The program may be stored in a computer-readable storage medium. When being executed, the program performs the processes in the foregoing embodiments. The storage medium may be a magnetic disk, a Compact Disk-Read Only Memory (CD-ROM), a Read Only Memory (ROM) or a Random Access Memory (RAM).

The foregoing descriptions are merely exemplary embodiments of the present invention, but not intended to limit the protection scope of the present invention. Various variations or substitutions made by those skilled in the art without departing from the scope of technical disclosures of the present invention shall fall within the protection scope of the present invention. Therefore, the protection scope of the present invention is subject to the appended claims.

What is claimed is:

1. A method for coexistence of multiple operating entity systems, comprising:
providing, by an operating entity, a subframe comprising a downlink (DL) timeslot for downlink transmission, an uplink (UL) timeslot for uplink transmission, and a guard period (GP) between the DL timeslot and the UL timeslot; and
setting the uplink timeslot of the subframe of the operating entity in a downlink carrier frequency interference region to be in an idle state so that a device does not transmit an uplink transmit signal to the operating entity in the subframe,
wherein networks of the operating entity and an adjacent operating entity are asynchronous and adopt subframes of equal lengths in different networks, and
wherein the operating entity and the adjacent operating entity comprise different number of component carriers including adjacent carrier frequencies from base stations in different operating entities.

2. The method of claim 1, wherein the downlink carrier frequency interference region is part or all of bandwidths of adjacent carrier frequencies between the operating entity and another operating entity.

3. The method of claim 2, wherein the adjacent carrier frequencies are adjacent carrier frequencies in carrier aggregation.

4. The method of claim 1, wherein the downlink carrier frequency interference region is part or all of bandwidths at edges of geographically adjacent cells between the operating entity and another operating entity.

5. The method of claim 1 comprising:
transmitting an uplink transmit signal through an uplink carrier frequency, wherein the uplink transmit signal originally needs to be sent in an uplink timeslot of the downlink carrier frequency interference region.

6. An apparatus for coexistence of multiple operating entity systems, comprising:
a setting unit, configured to provide a subframe comprising a downlink (DL) timeslot for downlink transmission, an uplink (UL) timeslot for uplink transmission, and a guard period (GP) between the DL timeslot and the UL timeslot; and
the setting unit further configured to set uplink timeslot of the subframe of the operating entity in a downlink carrier frequency interference region to be in an idle state so that a device does not transmit an uplink transmit signal to the operating entity in the subframe,
wherein networks of the operating entity and an adjacent operating entity are asynchronous and adopt subframes of equal lengths in different networks, and
wherein the operating entity and the adjacent operating entity comprise different number of component carriers including adjacent carrier frequencies from base stations in different operating entities.

7. The apparatus of claim 6, wherein the downlink carrier frequency interference region is part or all of bandwidths of adjacent carrier frequencies between the operating entity and another operating entity in different countries.

8. The apparatus of claim 7, wherein the adjacent carrier frequencies are adjacent carrier frequencies in carrier aggregation.

9. The apparatus of claim 6, wherein the downlink carrier frequency interference region is part or all of bandwidths at edges of geographically adjacent cells between the operating entity and another operating entity.

10. The apparatus of claim 6 comprising:
an uplink signal transmitting unit, configured to transmit an uplink transmit signal through an uplink carrier frequency, wherein the uplink transmit signal originally needs to be sent in an uplink timeslot of the downlink carrier frequency interference region.

11. The method of claim 2, comprising:
transmitting an uplink transmit signal through an uplink carrier frequency, wherein the uplink transmit signal originally needs to be sent in an uplink timeslot of the downlink carrier frequency interference region.

12. The method of claim 3, comprising:
transmitting an uplink transmit signal through an uplink carrier frequency, wherein the uplink transmit signal originally needs to be sent in an uplink timeslot of the downlink carrier frequency interference region.

13. The method of claim 4, comprising:
transmitting an uplink transmit signal through an uplink carrier frequency, wherein the uplink transmit signal originally needs to be sent in an uplink timeslot of the downlink carrier frequency interference region.

14. The apparatus of claim 7, comprising:
an uplink signal transmitting unit, configured to transmit an uplink transmit signal through an uplink carrier frequency, wherein the uplink transmit signal originally needs to be sent in an uplink timeslot of the downlink carrier frequency interference region.

15. The apparatus of claim 8, comprising:
an uplink signal transmitting unit, configured to transmit an uplink transmit signal through an uplink carrier frequency, wherein the uplink transmit signal originally needs to be sent in an uplink timeslot of the downlink carrier frequency interference region.

16. The apparatus of claim 9, comprising:
an uplink signal transmitting unit, configured to transmit an uplink transmit signal through an uplink carrier frequency, wherein the uplink transmit signal originally needs to be sent in an uplink timeslot of the downlink carrier frequency interference region.

17. A method for reducing interference, comprising:
determining, by a base station in a first operating entity, whether there is an edge frequency that causes interference when carrier frequencies of the first operating entity and a second operating entity are adjacent;
providing, by a device in the first operating entity, a subframe comprising a downlink (DL) timeslot for downlink transmission, an uplink (UL) timeslot for uplink transmission, and a guard period (GP) between the DL timeslot and the UL timeslot; and
setting uplink timeslot of the subframe in a downlink carrier frequency interference region to be in an idle state so that the device does not transmit an uplink transmit signal to the base station in the subframe,
wherein the first and second operating entities comprises base stations that are asynchronous and adopt subframes of equal lengths in different networks, and
wherein the first and second operating entities comprise different number of component carriers including adjacent carrier frequencies from base stations in different operating entities.

18. The method of claim 17, wherein the first and second operating entities adopt different frequency bands.

19. The method of claim 17, wherein the first and second operating entities are synchronous in respective internal networks.

* * * * *